United States Patent [19]
Barnard

[11] 3,850,228
[45] Nov. 26, 1974

[54] THERMAL REGENERATORS

[75] Inventor: Mark Cary Sedgwick Barnard, Kenilworth, England

[73] Assignee: Leyland Gas Turbines Limited, Warwickshire, England

[22] Filed: Aug. 6, 1973

[21] Appl. No.: 385,639

Related U.S. Application Data
[62] Division of Ser. No. 204,266, Dec. 2, 1971, abandoned.

[30] Foreign Application Priority Data
Dec. 18, 1970 Great Britain.................60113/70

[52] U.S. Cl. ............... 165/8, 64/27 NM, 192/41 R, 192/109 A, 192/55
[51] Int. Cl............................................. F28d 19/00
[58] Field of Search........... 165/8, 9, 10; 64/27 NM; 74/443; 192/41 R, 109 A

[56] References Cited
UNITED STATES PATENTS

| | | | |
|---|---|---|---|
| 445,922 | 2/1891 | Canedy | 192/41 R |
| 1,257,830 | 2/1918 | Evensen | 192/41 R |
| 2,398,261 | 4/1946 | Stone | 192/55 X |
| 3,296,829 | 1/1967 | Williams | 165/8 X |
| 3,311,204 | 3/1967 | Barnard | 165/8 X |
| 3,363,673 | 1/1968 | Harbidge | 165/8 |
| 3,496,993 | 2/1970 | Azelborn | 165/8 |

Primary Examiner—Albert W. Davis, Jr.
Attorney, Agent, or Firm—Brisebois & Kruger

[57] ABSTRACT

In a thermal regenerator of the kind having a rotary disc-type matrix, the matrix has at its central zone at least one member composed of a high-temperature elastomeric material which serves to transmit, to the matrix, driving torque from an axial drive-shaft.

2 Claims, 4 Drawing Figures

THERMAL REGENERATORS

This is a division, of U.S. Pat. application Ser. No. 204,266, filed Dec. 2, 1971, now abandoned.

This invention relates to thermal regenerators (otherwise known as regenerative heat-exchangers) of the kind having a rotary disc-type matrix.

Thermal regenerators of the kind referred to are usually incorporated in gas turbine power plants to extract heat from the exhaust gases, and to transfer it to the compressed intake-air before this enters the combustion chamber of the gas turbine engine. The rotary disc-type matrix normally employed, which is housed in the casing of the engine, comprises a foraminous refractory core (e.g. of ceramic or glass-ceramic material) formed with a multitude of open-ended, thin-walled passages lying substantially parallel to its rotational axis. Sector-like zones of the core are caused (by its rotation) to be presented alternately to the flow of the exhaust gases and to the flow of the compressed intake-air. In that way the required heat transference is effected.

Rotary disc-type matrices, as employed in gas turbine engines, are usually equipped with metallic driving means (e.g. toothed gearing) located at the periphery of the disc. In order to lessen the effects of differential thermal expansion between the matrix and the driving means, it has been proposed to have an elastomeric pad contacting the periphery of the matrix, and an annular driving means extending around and contacting the periphery of the pad, so that the pad transmits the driving torque to the matrix.

According to this invention, in a thermal regenerator of the kind specified above, the matrix has at its central zone at least one member composed of a high-temperature elastomeric material which serves to transmit, to the matrix, driving torque from an axial drive-shaft. This central-drive arrangement affords the advantages that it not only permits more freedom of design layout, but also ensures that the compression of the elastomeric member is increased by differential thermal expansion of the metallic drive-shaft.

The elastomeric member may be cast in situ, between the drive-shaft and the disc, or it may be preformed and subsequently installed.

Referring to the accompanying drawings.

Figure 1:
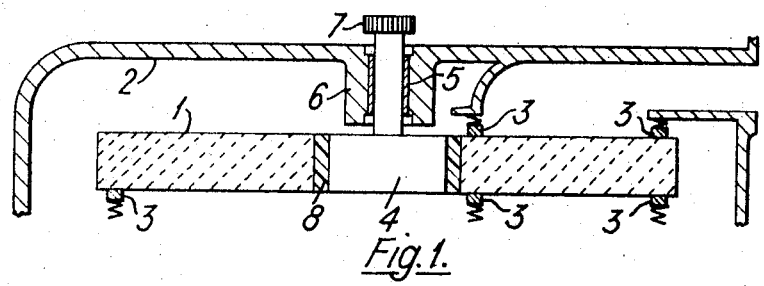
FIG. 1 illustrates schematically, in cross-section, the rotary disc-type matrix and a fragmentary portion of the casing of a thermal regenerator incorporating the invention.
Figure 2:
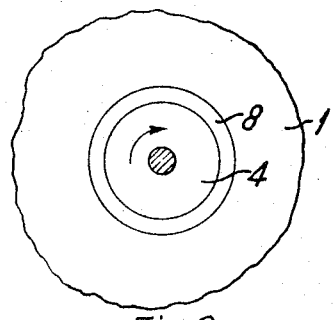
FIG. 2 is a fragmentary view in the axial direction of the matrix depicted in FIG. 1.

In the embodiment of the invention depicted in FIG. 1, a thermal regenerator has a rotary disc-type matrix 1 enclosed within a cover 2 (only a fragmentary portion of which is shown). As usual, counterface seals 3 are arranged to make rubbing contact with the respective faces of the matrix 1 in order to segregate the flows of the exhaust gases and the intake-air. A drive-shaft 4 is carried in a bearing 5 located in a central boss 6 on the heat-exchanger cover 2, with a driving means 7 (e.g. a sprocket or pulley) mounted on the end of the shaft 4 outside the cover.

The inner end of the drive-shaft 4 carries the regenerator disc 1, which has a bore-diameter at which the driving torque can be safely transmitted to the matrix material. A torque-transmitting member 8, which fills an annular gap initially existing between the bore of the disc 1 and the drive-shaft 4, is constituted by a high-temperature elastomer which can be poured or injected in place and then cured. In this case the drive is transmitted by resistance to shear of the elastomeric member 8 and its bonding to the drive-shaft 4 and the regenerator matrix 1.

Figure 3:
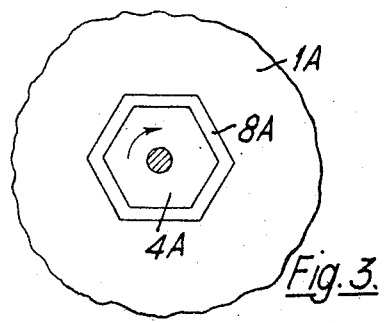
FIGS. 3 and 4 are fragmentary views (analogous to FIG. 2) of two further alternative drive-transmitting arrangements, either of which may be employed instead of the one shown in FIG. 2.

In an alternative embodiment, the elastomeric member is preformed and fitted between the drive-shaft and the regenerator matrix. In this case the respective contacting parts are of square or polygonal shape in cross-section, and the drive is transmitted by the resistance to compression of the elastomeric member. FIG. 3 exemplifies this arrangement with a preformed elastomer member 8A of polygonal shape in cross-section, which is fitted between the correspondingly shaped inner end of a drive-shaft 4A and the boundary of a polygonal central aperture formed in the matrix 1A.

Figure 4:
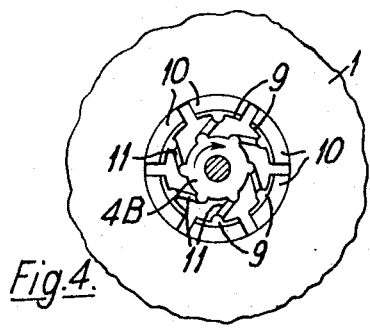

In another embodiment (see FIG. 4), segmental metal members 9, each carrying a facing pad 10 of elastomeric material conforming to the cylindrical bore of the matrix 1, are mounted on the inner end of an axial drive-shaft 4B by means of pinned links 11; the driving torque being transmitted to the ceramic disc 1 by the elastomeric pads 10 via the geometry of the links 11, which may be assisted by radial springs (not shown).

I claim:

1. A thermal regenerator of the kind having a rotary disc-type matrix, in which the matrix has at its central zone a plurality of members composed of a high-temperature elastomeric material which serves to transmit, to the matrix, driving torque from an axial drive-shaft each said elastomeric member comprising segmental metal members, each carrying a facing pad of the elastomeric material conforming to the cylindrical central bore of the matrix, said segmental metal members being mounted on the axial drive-shaft by means of pinned links.

2. In a thermal regenerator comprising a rotary disc type matrix driven by a drive-shaft extending axially of said matrix, the improvement which comprises a plurality of segmental metal members mounted by means of pinned links on the axial drive shaft, each carrying at least one member composed of a high-temperature elastomeric material and having a surface conforming to the bore of the matrix, said elastomeric members being positioned to transmit driving torque received from said drive shaft via said segmental members to said matrix.

* * * * *